Figure 1:
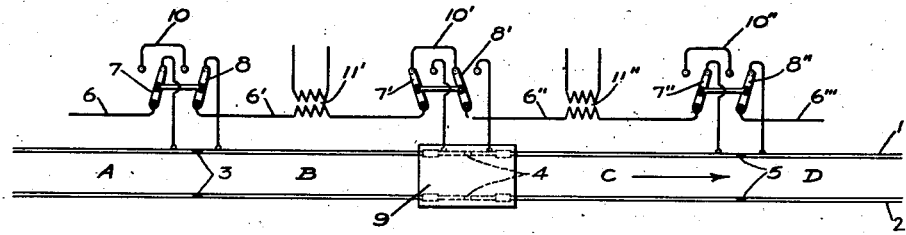

Jan. 1, 1935.  W. H. ARKENBURGH  1,985,911
RAILWAY SIGNAL SYSTEM
Filed June 6, 1930  2 Sheets-Sheet 1

Inventor:
Weber H. Arkenburgh,
by Charles E. Mullen
His Attorney.

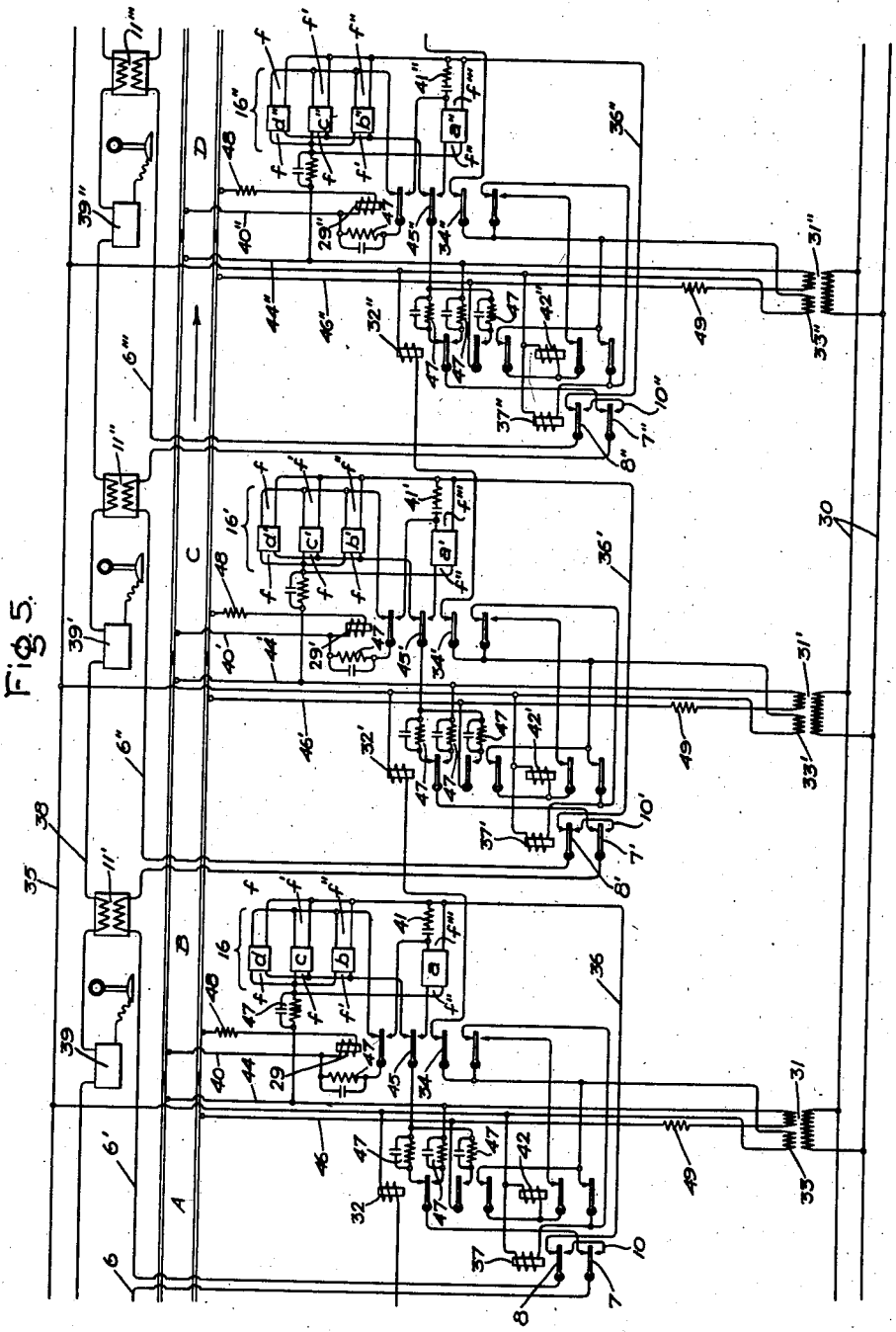

Patented Jan. 1, 1935

1,985,911

UNITED STATES PATENT OFFICE 1,985,911

RAILWAY SIGNAL SYSTEM

Weber H. Arkenburgh, Schenectady, N. Y., assignor to General Electric Company, a corporation of New York Application June 6, 1930, Serial No. 459,451

17 Claims. (Cl. 246—8)

My invention relates to railway signal and communication systems and it has among its objects to provide improved means whereby signalling may be effected between different trains, or vehicles, operating upon the system, between different parts of a single vehicle, or between stationary points along the track and a vehicle operating upon the track.

One of the more particular objects of my invention is to provide a system of loop circuits arranged along the track which are so controlled and operated that they serve as a medium for signalling either between vehicles, between different parts of the same vehicle or between a vehicle and a stationary point.

Still a further object of my invention is to provide novel means for indicating the position of a vehicle upon the track or the distance between two vehicles. A further object is to provide an improved means whereby an indication is produced upon a following vehicle of the speed at which a leading vehicle is operating and the distance between the two vehicles.

The system arranged in accordance with my invention may be employed as an alternative to, or to replace, the usual block signals, or to supplement the usual block signals which are arranged along the track with additional signals upon vehicles operating upon the system.

The system comprises a plurality of blocks. While I contemplate that these blocks may be of any suitable length, where the system is employed to supplement the track block signals, they are preferably coincident with the blocks of the block signal system whereby the track signals are operated. In this way I am able to take advantage, in connection with my invention, of certain of the track circuits and relays normally employed in the system for operating the track signals.

In each block of the system of my invention is a loop circuit extending throughout the block. This loop circuit may be formed in a number of different ways, within the contemplation of my invention, but in the form to be described, it suitably comprises one of the track rails and a line conductor extending along the track from end to end of each block together with relay equipment in each block whereby the mentioned line conductor and rail are connected in loop circuit relation. For communication between different points of a single vehicle, as for example, between the locomotive and caboose of a train, means may be provided at each point for transmitting to, or receiving from, or both, the track rail of the loop circuit, oscillations of desired frequency. Since the loop extends the entire length of the train, it thus forms a medium for this end to end signalling or communication. At the same time signal stations may be arranged at desired points along the way and arranged to cooperate with one or more of these loop circuits, thereby to effect signalling or communication with persons on a vehicle operating upon the track.

To effect signalling from one end of a train to another when the train extends in adjacent blocks, means are provided whereby the line conductors of the adjacent blocks are automatically connected in series to form with the track rails of said blocks a single loop extending throughout the blocks. Signalling may then be effected as before.

To effect signalling from one vehicle to another, means are provided in accordance with my invention whereby oscillations supplied to any loop circuit may be relayed to an adjacent loop circuit and thus to following loop circuits in succession, or in cascade, along the track to a point where they are received by a different vehicle. These oscillations may of course be modulated in accordance with any desired signals. Preferably communication or signalling from one vehicle to another is effected at a different frequency from that employed for communication between different points upon the same train or between a moving vehicle and a stationary point, thereby to avoid interference between the different signal operations.

As above stated, one of the objects of my invention is to provide means whereby the position of a vehicle upon the track may be determined and whereby an indication may be produced upon one vehicle of the distance between it and a leading vehicle. In accordance with this aspect of my invention the relay means whereby oscillations are relayed from one block to another are of a type, and are so arranged that oscillations of certain frequencies in the loop circuit of any block are relayed to the loop of the adjacent block in the direction opposite to the direction of traffic with a change in frequency whereas oscillations of a different frequency are relayed to the next block at the same frequency. The frequencies at which oscillations are repeated, or relayed, may of course be chosen as desired, but preferably the relay means are so arranged that oscillations transmitted from any vehicle are relayed through a predetermined number of blocks to the rear of said vehicle with an increase in frequency in each block. In blocks beyond this predetermined number the oscillations are repeated at the same frequency, i. e. without change in frequency. Thus the operator of a vehicle upon which oscillations of the highest of the chosen frequencies are received, is informed that there are at least a predetermined number of blocks betwen his vehicle and the vehicle next in advance upon the track. On the other hand if the received oscillations are of one or the other of the chosen frequencies, he is informed thereby of the exact number of blocks between his vehicle and the vehicle next in advance. It will, of course, be understood that these indications may also be made at stationary points along the track, the oscillations being received from the loop circuit.

The oscillations transmitted from any vehicle may be modulated in any desired way as by being interrupted at a rate dependent upon the speed of the vehicle, the interruptions being utilized upon the following vehicle to produce an indication of the speed of the leading vehicle.

It will of course be apparent that in a system of the type indicated, oscillations from a leading vehicle should be received upon the next following vehicle, but should not be transmitted past the following vehicle. At the same time the system must be such that the reception of these oscillations on the following vehicle may take place and at the same time the transmission of oscillations from the following vehicle to the next vehicle at the rear is not interfered with. Accordingly, another object of my invention is to provide means whereby these results may be brought about.

As was previously explained, the loop circuits through which oscillations are relayed from one vehicle to another comprise, in the form to be described, one rail and a line conductor. To prevent oscillations from being transmitted past a vehicle, however, means are provided whereby in response to the presence of a vehicle in any block oscillations from the loop circuit of the block in advance are supplied between the rails of the occupied block. These rails are of course short circuited by the vehicle thereby terminating the course of the oscillations along the track. These oscillations are received on the vehicle at the foremost end thereof from either or both of the rails. At the same time means are provided whereby the loop circuit of the occupied block is maintained in condition to transmit oscillations from the vehicle to the adjacent block at the rear and to a following vehicle but does not receive oscillations from the advance block.

Still another object of my invention is to provide means whereby the loop circuits are maintained in proper condition when a vehicle passes from one block partially into another, and when it then backs wholly into the first block and also when adjacent blocks are individually occupied by separate vehicles.

Figure 2:
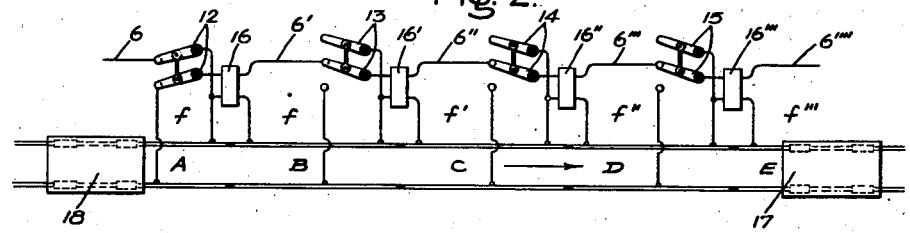
Figure 3:
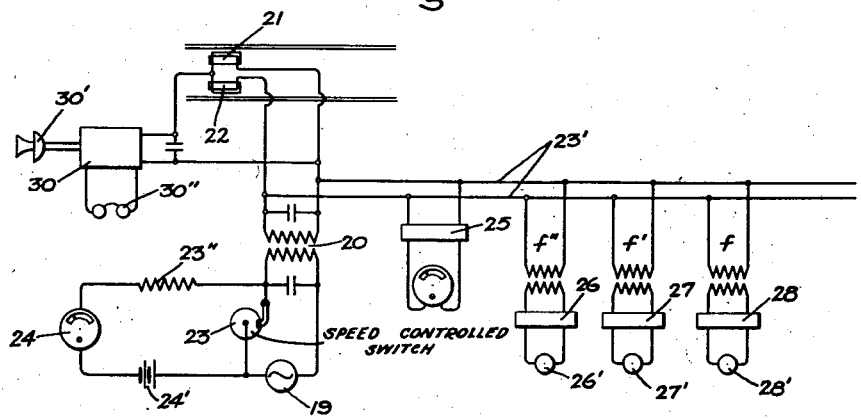
Figure 4:
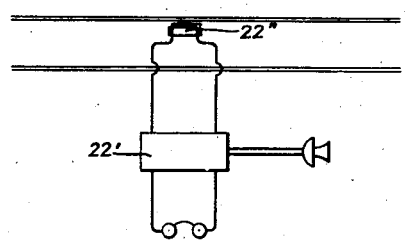

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Figs. 1 and 2 represent in a simplified manner certain of the signalling circuits which are shown in detail in Fig. 5; Fig. 3 represents the equipment which is arranged upon the locomotive of a train operated upon the system; Fig. 4 represents the equipment located upon the caboose or rear portion of the train; and Fig. 5 represents in detail the various signal circuits which are associated with the track. In each of Figs. 1, 2 and 5 it will be assumed that vehicles operate in the direction indicated by the arrow.

Referring to Fig. 1 of the drawings, I have indicated at 1 and 2 the track rails of a railway system. These rails are suitably divided into blocks A, B, C, D, etc. by means of insulating joints 3, 4, 5, etc. in accordance with the usual block signal practice. Extending from end to end of each of the blocks, A, B, C, D is a line conductor 6, 6', 6'', 6''' respectively. Switch elements 7 and 8, 7' and 8', 7'' and 8'' are shown at the adjacent ends of adjoining blocks. These switches are of a suitable double throw type so arranged that when a vehicle occupies both of two adjoining blocks, the switch is automatically thrown to the left, whereas when the vehicle occupies a single block, or the blocks are unoccupied, these switches are at the right. Thus in the drawings, I have indicated at 9 a vehicle having its forward wheels in the block C and its rear wheels in the block B, and the switch 7', 8' in the left hand position, whereas the switches 7 and 8, and 7'' and 8'' are in the right hand position. Thus a loop circuit is established which includes the upper rail of the block B, switch 8, line conductor 6', switch 7', conductor 10', switch 8', line conductor 6'', switch 7'', upper rail of the block C and thence through the metallic portions of the vehicle to the upper rail of the block B. Thus a complete loop circuit is established extending around the vehicle through the two blocks. Thus by means of suitable equipment, later to be described, upon, for example the forward portion of the vehicle, circulating currents may be established in this loop circuit, these circulating currents being utilized to induce additional currents in equipment located upon the rear of the vehicle. Thus, desired communication may be connected between different points of the vehicle.

If we assume now that the various blocks of Fig. 1 are unoccupied, or that any one, or more, of these blocks is occupied by a vehicle which is wholly within the block, then all of the switches will be in their right hand position and individual loop circuits will be established in each block. Thus for example, the loop circuit of block B will include the upper rail of that block, switch 8, line conductor 6' and switch 7' in its right hand position back to the rail B. A corresponding loop circuit will be established in block C and each of the other blocks. Thus communication between different points on the vehicle may be established through these individual loop circuits when the vehicle is wholly within any block. Signalling between the vehicle and stationary points along the track may of course be effected through these loop circuits as indicated by the transformers 11' and 11'', each of which may be employed to couple suitable signal equipment into the loop circuits. Of course any other suitable form of coupling may be employed.

The means whereby signalling is effected between vehicles is best indicated in a simplified way in Fig. 2. In this figure, switches 12, 13, 14 and 15 are shown in each of the blocks A, B, C, and D. The rectangles 16, 16', 16'' and 16''' represent relay equipment whereby oscillations from the loop circuit of any block may be relayed either with or without change in frequency, dependent upon the frequency of the oscillations, to the loop circuit of a different block. Thus, for example, the loop circuit of the block D will comprise the upper rail of said block, the input to relay 16'', line conductor 6''', lower armature of the switch 15 and output circuit of relay 16'''. Thus oscillations in the loop circuit of the block E are relayed by the relay equipment 16''' to the loop circuit of the block D. Similar loop circuits are indicated in blocks B and C. Thus, for example, oscillations which are supplied to the loop circuit of block E from the vehicle 17 occupying that block will be relayed by the equipment 16''' to the loop circuit of block D, thence by equipment 16'' to the loop circuit of block C and thence by relay equipment 16' to the loop circuit of block B, the loop circuits being thus arranged in cascade until a block is reached which is occupied by a vehicle, as shown for example at block A. When this occurs, the corresponding switch indicated as switch 12, is automatically operated to its lower position and accordingly, oscillations from the loop circuit of block B are relayed by the equipment 16 and supplied between the rails of the block A, whereby these oscillations may be received upon the vehicle 18 occupying that block. It will thus be seen that the oscillations are transmitted in the direction opposite to the direction of traffic from block to block until a block is reached which is occupied by a vehicle, in which block the track rails are substituted in the output circuit of the relay equipment for the loop circuit which normally constitutes the output circuit. Since the axles of the vehicle short circuit the rails, it will be seen that the course of the oscillations along the track is thus terminated.

The operation of the switch 12 downward, however, completes the loop circuit of the block A between the upper rail of that block and the line conductor 6 through the upper contact of the switch. Thus the loop circuit of that block is maintained in condition to transmit oscillations backward which are supplied thereto by the vehicle 18.

It will of course be understood that any desired form of signalling may be effected between the vehicles 17 and 18 with the means thus provided. Further, with the loop circuits as thus established, and by utilizing relay equipment of well known form, signalling in either direction between vehicles 17 and 18 may be effected. One of the particular objects of my invention, however, is to provide means whereby an indication may be had upon the following vehicle 18 of the distance between it and the leading vehicle 17. To this end I provide upon the locomotive of each of the vehicles the equipment shown in Fig. 3. This equipment comprises a source of oscillations 19 of any desired frequency, which is connected through a transformer 20 to suitable track inductors 21 and 22. These track inductors may be of any suitable construction but comprise coils arranged in a plane parallel with the rail such that the flux set up by the coil intercepts the rail thereby setting up circulating currents in the loop circuit which comprises the rail. Connected in the circuit between one side of the primary winding of transformer 20 and the source 19 is a suitable switch 23 arranged periodically to interrupt the circuit at a rate which is dependent upon the speed of the vehicle. Thus this switch may comprise a suitable rotating element which is driven, through means not shown, from the axle of the vehicle at a rate dependent upon the speed of the vehicle. Connected across the contacts of the switch 23 through a source of electromotive force 24' and a choke coil 23'' is a frequency meter 24 whereby an indication is produced of the speed of the vehicle. The choke coil serves to exclude current having the frequency of the source 19 from the meter 24. The meter 24 thus produces an indication in accordance with the rate of interruption of the direct current flowing through it and hence in accordance with the speed of the vehicle. Of course this indication may be produced in any other desired way. As thus described the equipment comprises a means whereby oscillations of predetermined frequency are supplied to the loop circuit occupied by the vehicle bearing modulations in accordance with the speed of the vehicle. The primary and secondary windings of the transformer 20 are shown as tuned to the frequency of the oscillations transmitted by source 19.

At the right hand portion of Fig. 3 is shown the equipment whereby these oscillations are received upon a following vehicle and an indication produced of the distance between the following vehicle and a leading vehicle together with an indication of the speed at which the leading vehicle is operating.

Thus, oscillations received from the rails which may have any one of a plurality of frequencies, induce electromotive forces in the inductors 21 and 22, which electromotive forces appear between the bus bars 23'. Suitably coupled to these bus bars are a plurality of receivers 25, 26, 27 and 28. These receivers are of any suitable construction and may, for example, be of the form shown in Patent No. 1,755,091 to Hugh E. Allen, issued April 15, 1930. The input circuits of receivers 26, 27 and 28, however, are each tuned to a different received frequency, and the output circuits are arranged to control the lighting of corresponding lamps 26', 27', 28' respectively. Thus, the operator by observing the lighting of the lamps may determine the frequency of oscillations received. The receiver 25 is arranged to respond to any of the frequencies to which the receivers 26, 27 and 28 respond but does not respond to the frequency of oscillations transmitted from a source 19, and its output circuit includes a frequency meter which indicates the rate at which the received oscillations are interrupted. Thus, this frequency meter provides an indication of the speed of the leading vehicle.

Thus, as previously pointed out, and again referring to Fig. 2, the relay equipment 16, 16', 16'', 16''' may repeat oscillations at either the same frequency or at a different frequency. The frequencies at which these equipments operate may be so chosen that oscillations supplied to the loop circuit of block E from a vehicle 17, for example, having, for example, a frequency $f'''$ will be repeated to the loop circuit of block D with a certain increased frequency $f''$. This frequency is then relayed to the block C at frequency $f'$ and thence to block B at frequency $f$. At blocks beyond block B, however, these oscillations are relayed without change in frequency. Thus blocks A and B are supplied with oscillations of the same frequency. Thus it will be seen that the receiving equipment of the vehicle 18 in block A will receive oscillations having a frequency $f$. If its receiver 28 is tuned to the frequency $f$, the lamp 28' will be lighted, thereby informing the operator that there are at least two blocks between the vehicle 18 and the leading vehicle 17. If we assume that the vehicle 17 is standing upon the track and vehicle 18 enters block B, it will still receive oscillations of the frequency $f$ and its lamp 28' will remain lighted. When it enters block C, however, it will receive oscillations of the frequency $f'$ to which the receiver 27 may be assumed to respond, thereby causing the lighting of lamp 27' and the extinguishing of lamp 28'. The operator is now informed that there is but one block between the vehicles 18 and 17. When the vehicle 18 enters block D, it will receive the frequency $f''$ to which the receiver 26 may be assumed to respond, thereby lighting lamp 26' and informing the operator that the leading vehicle is in the next block in advance.

It will be noticed that in transmitting and receiving oscillations from different vehicles both of the track inductors 21 and 22 are employed. It is pointed out, however, that in the transmitting operation only a small portion of energy is supplied from the inductor 22 to the lower rail for the reason that this rail constitutes an open circuit whereas the upper raid is connected in a complete loop circuit.

I have also shown in Fig. 3 at 30 equipment for communicating between different points on the same vehicle, as between locomotive and caboose, or between the vehicle and stationary points along the track. This equipment 30 is similar to equipment employed for radio or carrier current telephone or telegraphic communication over lines of a power distribution system including a suitable high frequency transmitting equipment for supplying oscillations to the inductor 21, and modulated in any desired manner, as in accordance with voice signals which are impressed upon the microphone 30'. This equipment also includes a suitable high frequency receiver whereby signals induced from the rail into the inductor 21 are detected and supplied to the headphones 30''. The frequency employed for this communication will of course be different from that employed for signalling between vehicles.

Fig. 4 represents similar equipment 22' which may be mounted upon the caboose of the train thereby to effect communication with the operator in the locomotive, this equipment being provided with a track inductor 22'' similar to the inductors 21 and 22.

A more detailed explanation of the circuits employed in connection with my invention will now be made in connection with Fig. 5. In this figure blocks A, B, C and D are indicated, each block being provided with the usual track relay 29', 29'', these relays being connected between the rails at the rearward end of the respective blocks. Alternating electromotive force is supplied to the advance end of each of the blocks from a suitable power circuit 30 through the block transformers 31, 31' and 31'' and the right hand secondary windings thereof, which are connected between the rails of the respective blocks. The equipment located at each block also includes a suitable line relay 32, 32', 32'', these relays being controlled by the track relays of the respective blocks but being arranged at the opposite end of the corresponding block. Thus, for example, the line relay 32' is controlled by track relay 29 through a circuit which extends from secondary winding 33 of transformer 31, through contact 34 of relay 29, relay 32' and common conductor 35 to the opposite side of the secondary winding 33. A similar circuit through contact 34' will be found for relay 32'' in block C, whereby this relay is controlled by track relay 29'. Thus it will be seen that when any block is occupied by a vehicle and its rails are thus short circuited, the track relay 29, 29', 29'' of the corresponding block is deenergized, this relay in turn deenergizing the line relay at the opposite end of the block. These relays may be those which are commonly employed in connection with block signalling systems but in accordance with my invention they are arranged to control the loop circuits and relay equipment whereby oscillations are repeated, or relayed, from one loop circuit to another.

The equipments for relaying oscillations from block to block are indicated in Fig. 5 by the brackets 16, 16' and 16''. Each of these relay equipments comprises a plurality of frequency changers indicated in connection with relay equipment 16 as $a$, $b$ and $c$, and repeater $d$. These frequency changers $a$, $b$ and $c$ may of course be of any suitable construction such as an electron discharge frequency multiplier or heterodyne beat frequency changer. Similarly, the repeater $d$ may be of any suitable type, such as a suitable electron discharge amplifier, whereby received oscillations are amplified and supplied at the same frequency to the outgoing circuit.

In the different circuits associated with the different blocks, I have shown a number of trap circuits 47. These trap circuits are provided in all of the circuits which include a portion of the rail and serve the purpose of excluding from the signalling circuits currents of the power frequency, that is, the frequency of the circuit 30. As shown in the drawings, these trap circuits comprise parallel connected inductance and capacity but it will of course be understood that any suitable means now known in the art whereby currents of the power frequency may be excluded from the signal circuits, may be employed as well. Further, it may be found in practice that these circuits, or means for this purpose, may be omitted. Similarly I have shown choke coils 48 in series with the track relays 29, 29', 29'' and choke coils 49 in series with the right hand secondary winding of the respective transformers 31, 31', 31''. These coils serve to confine currents having a frequency employed for signalling to the signal circuits. In describing the circuits no further reference will be had to these elements of the system.

To describe in detail the circuits whereby communication between different points of the same vehicle is accomplished when the vehicle is located wholly within one block, let us assume that the vehicle is in block B. The track relay 29 and line relay 32' will thus be deenergized. Oscillations supplied to the upper rail of the block B by the locomotive equipment (Fig. 3) of the vehicle which occupies the block then flows from the rear end of the upper rail through conductor 40, upper armature of relay 29 and its lower contact, tuned circuit 41 which is connected in shunt with the input circuit to frequency changer $a$, conductor 36, upper contact and armature 8 of relay 37, line conductor 6', armature 7' of relay 37' and its upper contact, upper armature of relay 32' and its lower contact and conductor 44' back to the upper rail of block B at the advance end of the block. Thus it will be seen that a complete loop circuit is established whereby communication may take place between different points on the vehicle. A similar loop circuit may be traced in each of the other blocks.

Each of the line conductors 6', 6'' and 6''' is arranged to be coupled to line conductor 38 whereby oscillations may be supplied from any of the loop circuits to stationary high frequency telephone equipment located at stations 39, 39', 39'' along the track. The telephone equipments may be coupled to a plurality of loop circuits thereby to communicate with a vehicle while it traverses a considerable distance along the track.

Now let us assume that the vehicle which was previously assumed to occupy block B, advances to a position such that the locomotive occupies block C and the caboose occupies block B. To properly control the loop circuits under this situation, relays 37' and 42', and similarly relays 37 and 42, and 37'' and 42'', are provided. The relay 42', and similarly each of the relays 42 and 42'', has a primary energizing circuit which includes the lower armature of relay 32' and a second circuit which includes the upper armature of relay 42' and the lower contact and lower armature of relay 29' which are normally separated. Thus relay 42' is deenergized in response to deenergization of relay 32' as when a vehicle enters the block B provided the block C is unoccupied. If block C is occupied then relay 42' remains energized. Relay 42' upon deenergization opens its lower contacts which are included in circuit with relay 37'. Relay 37', however, remains energized through a circuit which includes the lower armature of relay 29' and its upper contact. When the locomotive of the vehicle, however, enters block C, relay 29' is deenergized, thereby deenergizing relay 37'. A loop circuit is now established around the vehicle which extends from the upper rail at the rearward end of block B through conductor 40, upper armature and lower contact of relay 29, tuned circuit 41, conductor 36, upper contact and armature 8 of relay 37, line conductor 6', armature 7' and its lower contact, conductor 10', lower contact and armature 8', line conductor 6'', armature 7'' and its upper contact, upper armature and lower contact of relay 32'' and conductor 44'' to the upper rail at the advanced end of block C and thence through the metallic portions of the vehicle to the upper rail of block B. Thus a complete loop circuit is established around the vehicle, the line conductors 6' and 6'' being connected in series by deenergization of relay 37' and constituting with the upper rails of the blocks B and C a complete loop.

It will be seen, however, that this loop is not established when the block C is occupied prior to block B as might be the case with separate vehicles in the two blocks. In this case relay 29' is deenergized when relay 32' becomes deenergized and a holding circuit for relay 42' is thus established through the lower contact of lower armature of relay 29' whereby relay 42' is maintained energized. Relay 37' is then maintained energized through the lower contacts of relay 42' notwithstanding the deenergization of relay 29'. Thus relay 37' will remain energized and individual loop circuits as previously described will be established about each of the vehicles in blocks B and C.

It will further be seen that as the vehicle which was previously assumed to occupy block B advances into block C, and then backs again into block B, the individual loop circuit for block B is again established. This will be seen to follow from the fact that upon energization of relay 29' after the vehicle backs out of block C, relay 37' becomes energized through the lower armature and its upper contact of relay 29'. Thus the previous circuits are reestablished.

Now let us consider the operation of the system in connection with signalling between vehicles. Let us assume that blocks A, B and C are unoccupied and block D is occupied. The loop circuit for block D, in so far as it is shown in the drawings, extends from the rearward end of the upper rail thereof through conductor 40'', upper armature and lower contact of relay 29'', input circuit of frequency changer $a''$ of the relay equipment 16'', conductor 36'', upper contact and armature 8'' of relay 37'' and line conductor 6'''. Oscillations in this circuit, supplied thereto by a vehicle in block D, have the frequency $f'''$ and are relayed by the frequency changer $a''$ to the loop circuit of block C at a frequency $f''$. This loop circuit will now extend from the lower side of the output circuit of frequency changer $a''$ through conductor 44'', upper rail of the block C, conductor 40', upper armature and upper contact of relay 29' to one side of the input circuit of frequency changers $b'$ and $c'$ and repeater $d'$ all of which are connected in parallel and thence from the opposite side of these input circuits through conductor 36', upper contact and upper armature 8' of relay 37', line conductor 6'', armature 7'' and its upper contact, upper armature and upper contact of relay 32'' and armature 45'' and its lower contact to the upper side of the output circuit of frequency changer $a''$. Thus it will be seen that oscillations of the frequency $f''$ are supplied from the frequency changer $a''$ to the input circuits of the devices $b'$, $c'$, and $d'$. The input circuit of the device $b'$ may be assumed to be tuned to respond to the frequency $f''$ whereas the devices $c'$ and $d'$ are not tuned to this frequency. The loop circuit of block B, which we will assume is unoccupied, will then extend from the upper side of the output circuit of frequency changer $b'$ through conductor 44', upper rail of block B, conductor 40, upper armature and upper contact of relay 29 and input circuit of devices $b$, $c$ and $d$ in parallel, conductor 36, upper contact and armature 8 of relay 37, conductor 6', armature 7' and its upper contact, upper armature of relay 32' and its upper contact, armature 45' and its upper contact, to the opposite side of the output circuit of the frequency changer $b'$. The oscillations supplied to this circuit have the frequency $f'$ to which the input circuit of the frequency changer $c$ is tuned. The frequency changer $c$ converts these oscillations into oscillations of the frequency $f$ which are then supplied to the loop circuit of block A which may then be traced through elements of that block corresponding to elements of the loop circuit of block B which was just traced. These oscillations of frequency $f$ will then be repeated without change in frequency by the repeater $d$ (not shown) of block A and by the corresponding repeater of each successive block until a block is reached which is occupied by a vehicle.

To explain the operation when a block is reached which is occupied by a vehicle, let us assume that block A is occupied. Relay 32 will thus be deenergized and the circuit extending from the output of any of the devices $a$, $b$, $c$, $d$ will extend through conductor 44 to the upper rail of block A, through the wheels and axle of the train and thence from the lower rail through conductor 46, middle armature and contact of relay 32 and armature 45 to the opposite side of relay equipment $b$, $c$ and $d$ if the block B is unoccupied, or frequency changer $a$ if the block B is occupied. Thus it will be seen that instead of relaying the oscillations from block B to the loop circuit including the line conductor 6 of block A as would have been the case had the block A not been occupied, these oscillations are supplied to the two rails of that block. At the same time a connection is established from the advance end of the upper rail of block A through conductor 44, upper armature and lower contact of relay 32, upper contact and armature 7 to the line conductor 6, this connection establishing the loop circuit whereby oscillations in block A may be supplied to vehicles to the rear thereof. Thus it will be seen that since blocks D and A are occupied, the vehicle in block A receives oscillations of the frequency $f$, thereby informing the operator of that vehicle that there are at least two blocks between his vehicle and the leading vehicle. Had his vehicle been in block B, it would have received a frequency $f'$ or in block C a frequency $f''$, thereby providing a corresponding indication of the position of the vehicle ahead.

It will of course be understood that the stations 39, 39', 39'' may likewise be provided with means responsive to oscillations having the frequencies which are employed for signalling between vehicles whereby the position of the vehicles may be indicated along the track. The equipments of these stations may, of course, be selective to desired frequencies.

It will be noticed that the frequency received upon any vehicle from another is always of a different frequency from that transmitted by the same vehicle to another. This is because the current supplied from any vehicle is changed in frequency at the rearward end of the block occupied thereby. In this way the receiving equipment of any vehicle is not affected by oscillations transmitted from the same vehicle of a frequency employed for signalling between vehicles.

The tuned circuits 41, 41', 41'' are indicated as one means whereby oscillations of the frequency employed for communication between points on the same vehicle or between a vehicle and a stationary point is shunted past the first frequency changer. It will be understood that any suitable high pass or band pass filter may be employed for the purpose.

While I have shown a particular embodiment of my invention, it will of course be understood that I do not wish to be limited thereto since many modifications both in the circuit arrangement and in the instrumentalities employed may be made, and that I therefore contemplate by the appended claims to cover any such modifications as fall within the true spirit and scope of my invention.

What I claim as new and desire to secure by Letters Patent of the United States, is:—

1. The combination, in a signal system for railway vehicles, of means carried by each vehicle for transmitting current of a common frequency modulated in accordance with desired signals, means upon each vehicle responsive to current of a frequency different from said common frequency for producing an indication in accordance with said signal, and means whereby the current of said common frequency transmitted from any vehicle is changed in frequency and supplied to a different vehicle.

2. The method of indicating the position of a vehicle upon a track which includes transmitting current having a certain predetermined frequency from the vehicle, receiving said current at a point where indications are to be made and changing the frequency of said currents subsequent to transmission from said vehicle at at least one additional predetermined point along the track and prior to reception at said point where indications are to be made.

3. The method of indicating the distance between moving vehicles which includes transmitting oscillations having a certain frequency from one vehicle to the other vehicle, and changing the frequency of said oscillations at a number of fixed points in the path of travel of said oscillations, said number of points being dependent upon the distance between said vehicles.

4. The method of signaling between moving vehicles which includes transmitting oscillations having a certain frequency from one vehicle to another, changing the frequency of said oscillations at a number of fixed points in the path of travel of said oscillations, said number of points being dependent upon the distance between said vehicles, modulating said oscillations in accordance with the speed of the first vehicle and producing an indication on the second vehicle in accordance with the frequency of received oscillations and the modulation thereof.

5. The combination, in a railway signal system, comprising a plurality of blocks, of a loop circuit in each block and means in each block to relay oscillations from the loop circuit of the respective block with change in frequency to the loop circuit of an adjacent block.

6. The combination, in a railway signal system, comprising a plurality of blocks, of a loop circuit in each block and means in each block for relaying oscillations having a certain frequency from the loop circuit of the respective block with change in frequency to the loop circuit of an adjacent block, and for relaying oscillations having a different frequency from the respective block to an adjacent block at the same frequency.

7. The combination, in a railway signal system, comprising a plurality of blocks, of a system of track circuits in each block, means carried by each vehicle to supply oscillations to the track system of the block occupied thereby and to receive oscillations from the track system and means in each block to relay oscillations having a certain frequency from the track system of the respective block to the system of track circuits of an adjacent block with change in frequency, and to relay oscillations of other frequency, without change in frequency, said means being so arranged that oscillations transmitted from any vehicle are supplied to a different vehicle through the track circuits of a plurality of blocks, the frequency being changed in certain of said blocks.

8. The combination, in a railway signal system, comprising a plurality of blocks, of a system of track circuits in each block, means carried by each vehicle to supply oscillations to the track system of the block occupied thereby and to receive oscillations from the track system, and means in each block to relay oscillations from the track system of the respective block to the system of track circuits of an adjacent block, said means being so arranged that oscillations transmitted from any vehicle are supplied to a different vehicle through the track circuits of a plurality of blocks, said oscillations being changed in frequency in a predetermined number of the blocks first traversed by said oscillations and repeated without change in frequency in subsequent blocks.

9. The combination, in a railway signal system, of means carried by a vehicle for transmitting oscillations having a certain frequency and for modulating said oscillations in accordance with the speed of the vehicle, means carried by a second vehicle for receiving said oscillations and for producing an indication in accordance with the modulation thereof, means for changing the frequency of said oscillations before they are received in accordance with the distance between the two vehicles and means carried by said second vehicle for producing an indication in accordance with the frequency of the received oscillations.

10. The combination, in a railway signal system, of means carried by a vehicle for transmitting current having a certain frequency, means carried by a second vehicle for receiving said current and for producing an indication in accordance with the frequency thereof, and means for changing the frequency of said current in its path between said vehicles in accordance with the distance between the vehicles.

11. The combination, in a railway signal system, comprising a plurality of blocks, of a loop circuit in each block, means for supplying oscillations from a vehicle in any block to the loop circuit of the respective block, means for relaying oscillations from each loop circuit to the loop circuit of an adjacent block, means on each vehicle responsive to oscillations received from another vehicle through said loop circuits, and means responsive to the presence of a vehicle in any block to prevent oscillations transmitted by a vehicle in another block from being transmitted past a vehicle in the block in which said means is located.

12. The combination, in a railway signal system, comprising a plurality of blocks, of a loop circuit in each block including a line conductor, means for supplying oscillations to the loop circuit of any block, means for relaying oscillations from the loop circuit of any block to the loop circuit of the next block whereby said loop circuits are arranged in cascade, and means responsive to the presence of a vehicle in any block to cause oscillations in the loop circuit including said line conductor of the block adjacent the block occupied by said vehicle to be supplied between the rails of said occupied block, and means carried by a vehicle for receiving said oscillations from at least one of said rails.

13. The combination, in a railway signal system, comprising a plurality of blocks, of a loop circuit including a line conductor in each block, means for relaying oscillations from the loop circuit of any block to the loop circuit of an adjacent block whereby said loop circuits are arranged in cascade, and means responsive to the presence of a vehicle in any block to cause oscillations in said loop circuit including said line conductor of the block adjacent the block occupied by said vehicle to be supplied between the rails of the block occupied by said vehicle and for maintaining a loop circuit including said line conductor in the block occupied by the vehicle.

14. The combination, in a railway signal system comprising a plurality of blocks, of an individual loop circuit extending through each block, and means whereby when a vehicle extends into adjacent blocks the loop circuits of said blocks are automatically connected together to form a single loop extending through said adjacent blocks, said means being operable when the vehicle operates in a direction opposite to the direction of traffic out from one of said adjacent blocks to reestablish said individual loop circuits.

15. The combination, in a railway signal system, comprising a plurality of blocks, of a loop circuit extending through each block, a vehicle, carrier wave signal means carried at different points on said vehicle and arranged to cooperate with said loop circuit and means to modulate the carrier wave whereby carrier wave signalling is effected between said points on said vehicle through said loop circuits.

16. The combination, in a railway signal system, comprising a plurality of blocks, of a track circuit system in each block, means carried on each vehicle operating on the system for transmitting oscillations having a certain frequency to the track circuit system of the block occupied thereby and selectively to receive therefrom oscillations of different frequency and means for relaying oscillations from the track circuit system of one block to the track circuit system of a different block at a frequency which may be received by a vehicle in said different block whereby signalling is effected between vehicles and the receiving means of the different vehicles is unaffected by the transmitting means of the same vehicle.

17. The combination, in a railway signal system, comprising a plurality of blocks, of a track circuit system in each block, means carried by a vehicle for transmitting oscillations having a plurality of different frequencies to the track circuit system of the block occupied thereby, means for relaying oscillations of one of said frequencies to the track circuit system of a different block whereby the relayed oscillations may be received from said different block and other means to receive oscillations of a different one of said frequencies directly from the track circuit system of the occupied block.

WEBER H. ARKENBURGH.